(12) United States Patent
Barker (10) Patent No.: US 11,675,738 B2
(45) Date of Patent: Jun. 13, 2023

(54) DATABASE LOCKING USING LOGICAL LOCK MECHANISM

(71) Applicant: Neustar, Inc., Sterling, VA (US)

(72) Inventor: Edward F. Barker, Reston, VA (US)

(73) Assignee: NEUSTAR, INC., Reston, VA (US)

( * ) Notice: Subject to any disclaimer, the term of this patent is extended or adjusted under 35 U.S.C. 154(b) by 117 days.

(21) Appl. No.: 15/690,091

(22) Filed: Aug. 29, 2017

(65) Prior Publication Data
US 2019/0065516 A1 Feb. 28, 2019

(51) Int. Cl.
*G06F 16/23* (2019.01)
*G06F 16/13* (2019.01)

(52) U.S. Cl.
CPC .......... *G06F 16/13* (2019.01); *G06F 16/2343* (2019.01)

(58) Field of Classification Search
CPC ...... G06F 16/13; G06F 16/1774; G06F 16/20; G06F 16/2308; G06F 16/2336; G06F 16/2343
See application file for complete search history.

(56) References Cited

U.S. PATENT DOCUMENTS

| | | | | |
|---|---|---|---|---|
| 5,485,607 A * | 1/1996 | Lomet | ................. | G06F 16/2343 |
| 5,910,981 A * | 6/1999 | Bhagat | ................. | H04M 15/00 |
| | | | | 379/219 |
| 6,298,352 B1 * | 10/2001 | Kannan | ............... | H04M 3/4931 |
| 6,330,598 B1 * | 12/2001 | Beckwith | ............. | H04Q 3/0029 |
| | | | | 709/223 |
| 6,473,503 B1 * | 10/2002 | Karau | ............... | H04M 3/42144 |
| | | | | 379/221.13 |
| 6,952,692 B1 * | 10/2005 | Bhattiprolu | ......... | G06F 16/2343 |
| | | | | 707/704 |
| 7,269,588 B1 * | 9/2007 | Verma | ................. | G06F 16/2343 |
| 7,487,228 B1 * | 2/2009 | Preslan | ............... | H04L 67/1097 |
| | | | | 709/219 |
| 10,404,700 B1 * | 9/2019 | Bernard | .................. | H04L 63/20 |
| 2002/0091694 A1 * | 7/2002 | Hrle | .................... | G06F 16/2343 |
| 2002/0165625 A1 * | 11/2002 | Beier | ...................... | G06F 16/10 |
| | | | | 700/50 |
| 2003/0163494 A1 * | 8/2003 | Bender | ............... | G06F 16/2343 |
| 2003/0172013 A1 * | 9/2003 | Block | .................... | G06Q 30/02 |
| | | | | 705/33 |
| 2004/0205066 A1 * | 10/2004 | Bhattacharjee | ..... | G06F 16/2343 |
| 2007/0299814 A1 * | 12/2007 | Barsness | ............. | G06F 16/2453 |
| 2011/0071993 A1 * | 3/2011 | Vasudevan | ............ | G06F 16/282 |
| | | | | 707/704 |
| 2011/0087642 A1 * | 4/2011 | Rajamani | ............... | G06F 16/907 |
| | | | | 707/704 |
| 2012/0109920 A1 * | 5/2012 | Forster | ................ | G06F 16/1774 |
| | | | | 707/704 |
| 2013/0129066 A1 * | 5/2013 | Yeung | ............... | H04M 3/42297 |
| | | | | 379/211.01 |

(Continued)

*Primary Examiner* — James E Richardson
(74) *Attorney, Agent, or Firm* — Sterne, Kessler, Goldstein & Fox, P.L.L.C.

(57) ABSTRACT

Systems and methods for locking databases during database operations, such as logical mechanisms for locking a local number portability (LNP) database associated with the Number Portability Administration Center (NPAC), are described. For example, the systems and methods may utilize various logical constructs, such as parameters that identify items or records within a database (e.g., object type and value information), and lock records that include such parameters.

20 Claims, 4 Drawing Sheets

(56) References Cited

U.S. PATENT DOCUMENTS

| | | | |
|---|---|---|---|
| 2014/0269679 A1* | 9/2014 | Gillis | H04M 15/49 370/352 |
| 2016/0012549 A1* | 1/2016 | Block | G06Q 40/12 705/30 |
| 2019/0171721 A1* | 6/2019 | Oukid | G06F 16/2308 |

* cited by examiner

DATABASE LOCKING USING LOGICAL LOCK MECHANISM

BACKGROUND

Telephone numbers, throughout their lifetimes, are often transferred from one service provider to another, from one network endpoint to another, from one device to another, and so on. In order for a user (owner) to maintain control of his/her number, LNP, or local number portability, provides a system that enables end users to keep their telephone numbers when switching from one communications service provider to another.

A local number portability (LNP) database may store a variety of records or other data items associated with the porting of numbers between carriers or service providers, such as records associated with telephone numbers previously ported between carriers (e.g., "actively ported" numbers), telephone numbers about to be ported (e.g., "pending" numbers), and so on.

Typically, the LNP database facilitates multiple or concurrent processes, such as database operations performed by different service providers, associated with the records or items stored within the LNP database. However, given the nature and storage architecture of the LNP database, typical database locking mechanisms (e.g., where data items are used as primary keys to lock records being read from or written to), are ineffective in ensuring that the records are not corrupted or invalidated during concurrently performing operations within or associated with the LNP database.

These and other problems exist with respect to utilizing typical locking mechanisms when reading data from the LNP database or writing data to the LNP database using concurrent operations, among other drawbacks.

BRIEF DESCRIPTION OF THE DRAWINGS

Embodiments of the disclosed technology will be described and explained through the use of the accompanying drawings.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Overview

Systems and methods for locking databases during database operations, such as logical mechanisms for locking a local number portability (LNP) database associated with the Number Portability Administration Center (NPAC), are described. For example, the systems and methods may utilize various logical constructs, such as parameters that identify items or records within a database (e.g., object type and value information), and lock records that include such parameters.

Therefore, unlike typical lock mechanisms, the systems and methods facilitate the locking of multiple records that contain or share identical or similar information. For example, the LNP database may contain multiple records that each include a specific telephone number, such as a database of records for actively ported telephone numbers and a database of records pending telephone numbers.

Given a telephone number shared by both databases, the systems and methods, by utilizing the locking mechanisms described herein, may facilitate the locking of records in both databases. Thus, the systems and methods may prevent multiple, different, or concurrent database operations from accessing the same records, among other benefits.

In some embodiments, the systems and methods access a database operation to be performed by an application with respect to one or more records stored within the database, extract an object identifier and value associated with the database operation, and lock one or more records stored within the database that include the extracted object identifier and value. For example, the systems and methods extract an item type of a telephone number (e.g., "TN") and a value for the item type (e.g., "999-999-9999"), and lock records that include the information.

In some embodiments, the systems and methods provide a lock manager, or similar database manager, which locks items stored within a database during a database operation performed with the items, and includes an item identification module that identifies items to be locked that include data having a specific item type and value, and a lock module that locks multiple items stored within the database that match the specific item type and value.

Therefore, as described herein, the systems and methods facilitate the locking of records with a database by defining parameters for records to be locked that are based on item types and item values, and locking the records that match or include the parameters. Such a locking mechanism enables the systems and methods to lock multiple records during concurrent database operations, and to lock records to be associated with data that originally does not exist in a database, among other benefits.

Various embodiments of the system will now be described. The following description provides specific details for a thorough understanding and an enabling description of these embodiments. One skilled in the art will understand, however, that the system may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

Many aspect of the systems and methods described herein are directed to applications associated with constructing, generating, and/or determining porting history information for telephone numbers. These applications utilize systems and processes that, in the generalized case, facilitate temporal data extraction for objects having dynamic inheritances. Therefore, what follows is a description of various systems associated with extracting temporal data for objects having dynamic inheritances (e.g., including the construction of data sequences and other data structures). Applications of such temporal extractions, such as those directed to telephone numbers and their associated porting histories, are described herein.

Examples of Logical Locking Mechanisms for Locking a Database

Figure 1:
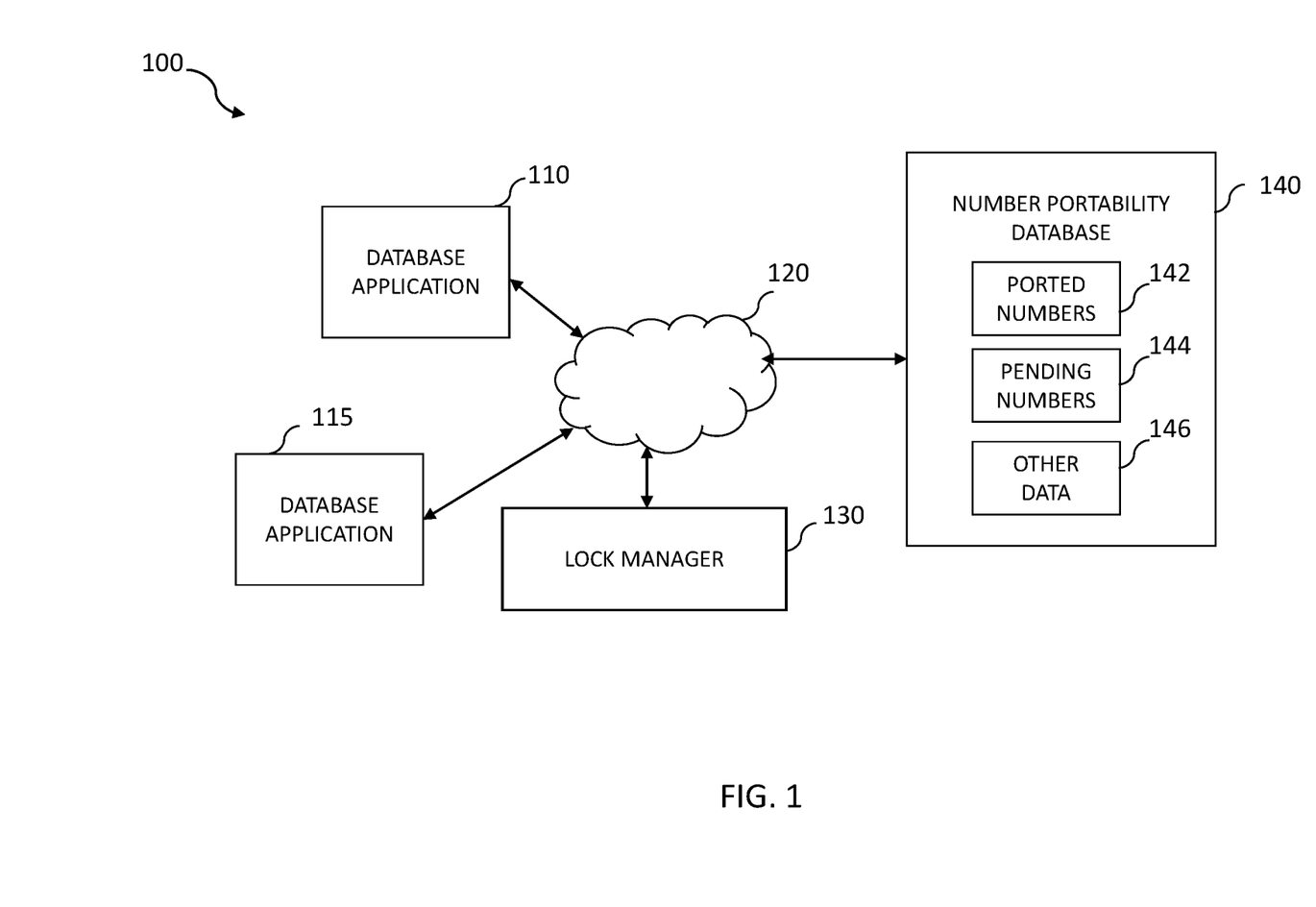
FIG. 1 is a block diagram illustrating a suitable computing environment for implementing a lock manager with a local number portability (LNP) database.

As described herein, the systems and methods facilitate the locking of records within a database that match or include various parameters, such as item types and associated values for the items (e.g., a "TN" item type having a value of "999-999-9999"). FIG. 1 is a block diagram illustrating a suitable computing environment 100 for implementing a lock manager with a local number portability (LNP) database.

Multiple different database applications, such as a database application 110 at a first service provider and a database application 115 may access a local number portability (LNP) database 140 over a network 120, such as the Internet. The applications 110, 115 may access the LNP database 140 to perform various database operations associated with telephone numbers and other related information when numbers are being ported between service providers or carriers, when numbers are being provided or disbursed to service providers or carriers, and so on.

For example, the applications 110, 115 may perform read or write operations upon accessing different databases, or sets of records, within the LNP database 140, such as actively ported numbers records 142 (e.g., telephone numbers previously ported between carriers, pending telephone numbers about to be ported records 144 (e.g., numbers to be ported between carriers), and other records 146, such as records associated with local routing numbers (LRNs), service providers (SPIDs), and so on.

The number portability database 140, therefore, includes a vast amount of data associated with a telephone number and its current or previous porting status. For example, the number portability database 140 may store previous or current service provider information and service endpoint information, such as an SMS SS7 address, a switch/routing number, a SIP URI, and so on.

The number portability database 140, therefore, may store various types of information, items, or records. Example types of information, data, or records stored in the number portability database 140 include:

TN—telephone number information;
SPID—telephone service provider information, including service provider identifiers (SPID), carrier types, carrier names, service regions, and so on;
NPA_NXX—information about NPA NXX, such as SPID, activation timestamps, and so on;
LRN—information of location routing numbers, activation timestamp, and so on;
NPA_NXX_X—information about number pooling blocks involved in pool block activations;
BLOCK—Information of active number pooling block, such as ownership, LRN, SS7, network addresses, internet service endpoints/URLs, and so on;
SV—Ported TN subscription version data, such as ownership, LRN, SS7 network addresses, internet service endpoints/URLs, and so on;
NPA_SPLIT—Information about NPAs to be split into two;
NPA_NXX_SPLIT—Information related to NPA NXXs to be moved from an old NPA code to a new NPA code due to an NPA split; and so on.

For example, the database may store an object or item as a 3-digit area code (a numbering plan area or "NPA"), such as "703," as a parent object of a 6-digit NPA-NXX object (e.g., a central office or "CO" code that indicates a service provider and switch associated with the telephone number), such as "703-555," which is a parent object of a 7-digit BLOCK object (e.g., a "thousands block" or grouping of a thousand numbers having the same CO code), such as "703-555-1," which is a parent object of the telephone number "703-555-1234." The database 140, therefore, may store the objects, their attributes, and the dynamically changing relationships between the objects, as described herein.

In order to prevent corruption of the database 140 and various records stored within the database 140, the systems and methods provide a lock manager 130 or other database management component, which performs various operations to lock records or items during database operations (e.g., read or write operations) performed with respect to the records. For example, the multiple database applications 110, 115 may attempt to access records to update the records when a telephone number is ported from one carrier to another. The lock manager 130, utilizing the systems and methods described herein, manages and controls the locking of the records to a single application, to prevent corruption or invalidation of the records due to multiple accesses during read/write operations. Further details describing the lock manager 130 will be described herein.

FIG. 1 and the discussion herein provide a brief, general description of the components of the computing environment 100. Although not required, aspects of the computing environment 100 are described in the general context of computer-executable instructions, such as routines executed by a general-purpose computer, e.g., a mobile device, a server computer, or a personal computer. The system can be practiced with other communications, data processing, or computer system configurations, including Internet appliances, hand-held devices (including tablet computers and/or personal digital assistants (PDAs)), all manner of cellular or mobile phones (e.g., smartphones), multi-processor systems, microprocessor-based or programmable consumer electronics, set-top boxes, network PCs, mini-computers, mainframe computers, and the like. Indeed, the terms "computer," "host," "host computer," "mobile device," and "handset" are generally used interchangeably herein and refer to any of the above devices and systems, as well as any data processor.

Aspects of the environment 100 can be embodied in a special-purpose computing device or data processor that is specifically programmed, configured, or constructed to perform one or more of the computer-executable instructions explained in detail herein. Aspects of the system may also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the environment 100 may be stored or distributed on computer-readable media (e.g., physical and/or tangible non-transitory computer-readable storage media), including magnetically or optically readable computer discs, hard-wired or preprogrammed chips (e.g., EEPROM semiconductor chips), nanotechnology memory, or other data storage media. Indeed, computer-implemented instructions, data structures, screen displays, and other data under aspects of the system may be distributed over the Internet or over other networks (including wireless networks), on a propagated signal on a propagation medium (e.g., an electromagnetic wave, a sound wave, etc.) over a period of time, or they may be provided on any analog or digital network (packet-switched, circuit-switched, or other scheme). Portions of the system reside on a server computer, while corresponding portions reside on a client computer such as a mobile or portable device, and thus, while certain hardware platforms are described herein, aspects of the system are equally applicable to nodes on a network. In an alternative embodiment, the mobile device or portable device may represent the server portion, while the server may represent the client portion.

Figure 2:
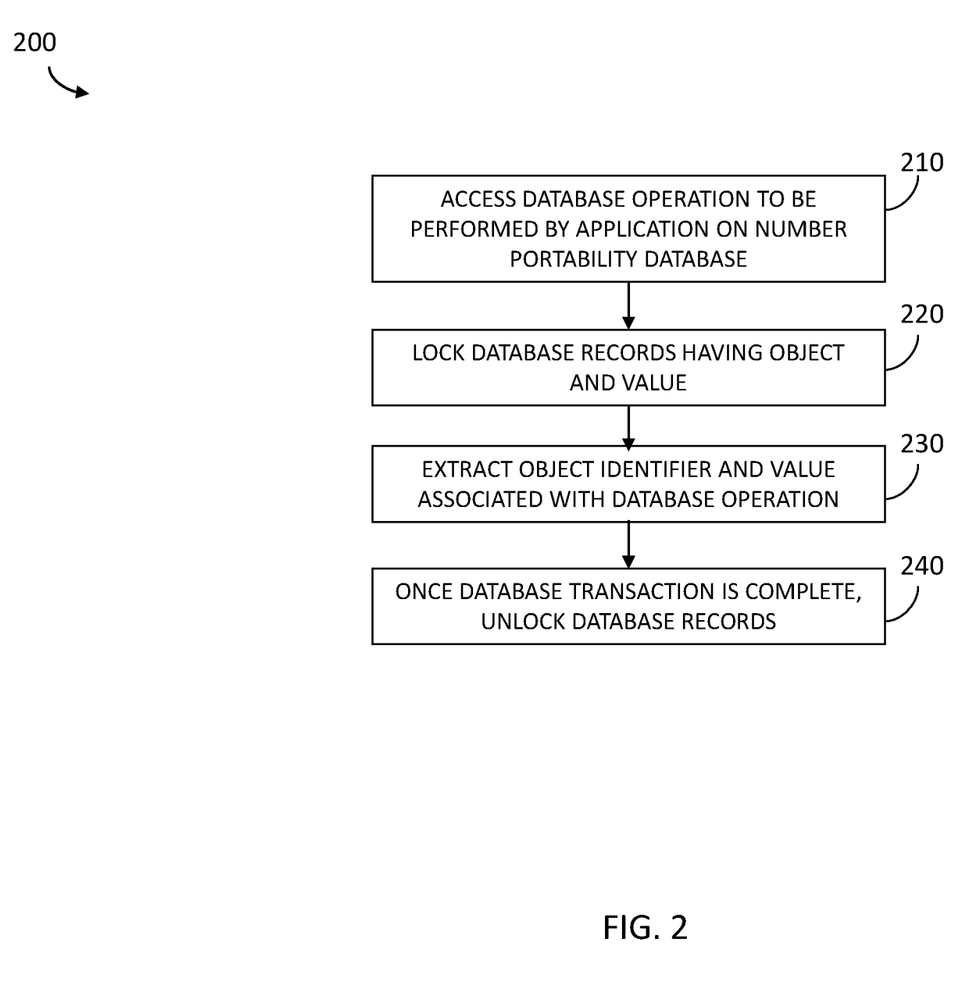
FIG. 2 is a flow diagram illustrating a method for locking a database during a database operation.

As described herein, the lock manager 130 may perform various operations for locking a database and/or various records within a database during database operations. FIG. 2 is a flow diagram illustrating a method 200 for locking a database during a database operation. Aspects of the method 200 may be performed by the lock manager 130 and, accordingly, is described herein merely by way of reference thereto. It will be appreciated that the method 200 may be performed on any suitable hardware.

In operation 210, the lock manager 130 accesses a database operation to be performed by an application with respect to one or more records stored within the database. For example, the lock manager 130 may receive or access information provided by the database applications 110, 115, which access the LNP database 140 to perform read/write operations when updating the porting records stored within the database 140.

In operation 220, the lock manager 130 locks one or more records stored within the database that include the extracted object identifier and value. For example, using the logical lock mechanism describes herein, the lock manager 130 may lock multiple records that share a common type identifier and value, such as a specific phone number (e.g., TN=999-999-9999).

Figure 3A:
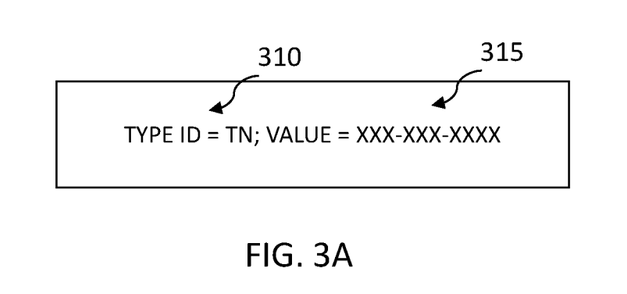
FIG. 3A-3D are diagrams representing different parameters for logically locking a database during a database operation.
Figure 3B:
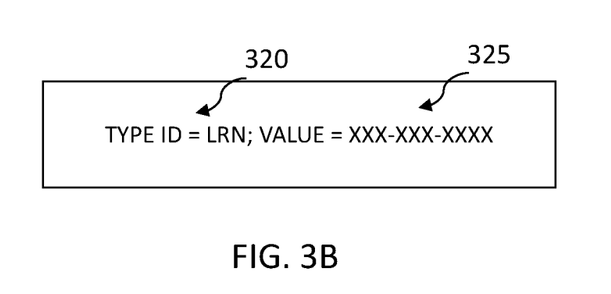
Figure 3C:
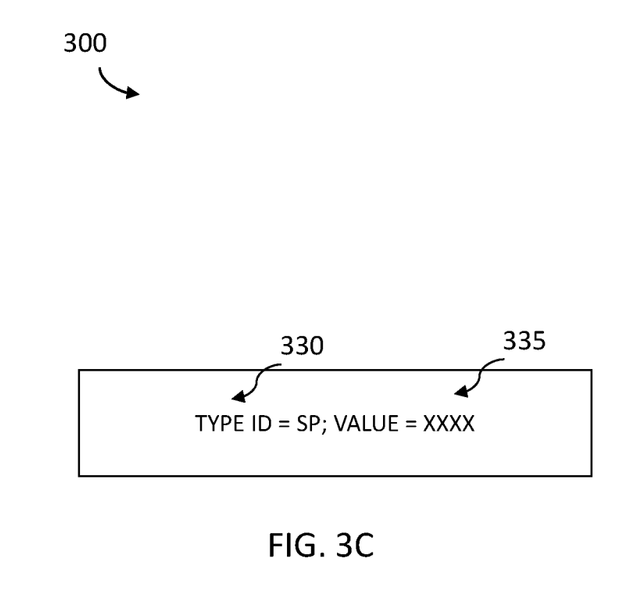
Figure 3D:
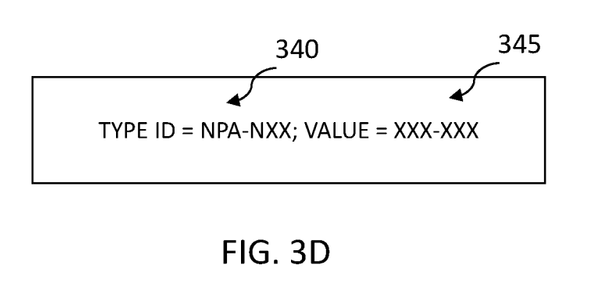

As described herein, the lock manager 130 may lock records that correspond or store information that matches or is similar to certain data parameters, such as an item or object type identifier, represented by a string of alphanumeric digits, and a value assigned to the item or object type. In some cases, the type identifier may relate to various types of items or objects stored within the LNP database 140, such as telephone numbers and other related entities. FIG. 3A-3D are diagrams representing different parameters utilized when locking records within the LNP database 140 during a database operation. For example:

FIG. 3A depicts information used when locking records associated with a telephone number, represented by an item type 310 of "TN," and a value 315 represented by a ten digit string of numbers, such as "XXX-XXX-XXXX," which represents a specific telephone number;

FIG. 3B depicts information used when locking records associated with a switch, represented by an item type 320 of "LRN" for local routing number, and a value 325 represented by a ten digit string of numbers, such as "XXX-XXX-XXXX, which represents a specific switch or local routing number within a telecommunications network";

FIG. 3C depicts information used when locking records associated with a service provider or carrier, represented by an item type 330 of "SP" or "SPID," and a value 335 represented by a four digit string of numbers, such as "XXXX," which represents a specific service provider or carrier;

FIG. 3D depicts information used when locking records associated with a service provider or carrier, represented by an item type 340 of "NPA_NXX," which represents a block of numbers or CO Code, and a value 345 represented by a six digit string of numbers, such as "XXX-XXX," which represents a specific block of numbers or CO Code; and so on.

Of course, the lock manager 130 may utilize other information when identifying records to lock during database operations, such as other item types or values described herein.

Returning back to FIG. 2, the lock manager 130, in operation 230, extracts an object identifier and value associated with the database operation. For example, the lock manager 130 may extract or otherwise retrieve information that identifies a telephone number or other data associated with the database operation.

Thus, in some cases, the lock manager 130 may lock different types of records within the LNP database 140, such as one or more ported numbers records 142 that store information associated with telephone numbers previously ported between carriers, and one or more pending numbers records 144 that store information associated with telephone numbers to be ported between carriers.

In other cases, the lock manager 130 may lock records that do not contain, at the time of performance of a database operation, a record associated with a telephone number or other item or object type. In such cases, one of the database applications 110 or 115, via the lock manager 130, may utilize the logical locking mechanism described herein and lock a record or logical entry (e.g., a TN) within the LNP database 140. Once the record is locked, the application 110 or 115 may create and/or insert an initial entry or record for a specific item or object (e.g., the TN) to the database 140, and then commit the change to the database and release the locked record via the lock manager 130.

In operation 240, the lock manager 130, after completing the database transaction (e.g., determining the database operation was performed by the application), unlocks the one or more records stored within the database that include the extracted object identifier and value. Thus, once the database operation or transaction is complete, the lock manager 130 unlocks the record for access by other applications.

Thus, in some embodiments, the lock manager 130 locks items stored within a database during a database operation performed with the items via an item identification module that identifies items to be locked that include data having a specific item type and value, and a lock module that locks multiple items stored within the database that match the specific item type and value. As described herein, when the database is the LNP database 140, the lock module may lock a ported numbers record and a pending numbers record in response to the item identification module identifying that data having a specific item type of a telephone number (TN) and an associated ten digit value for the telephone number is stored within the ported numbers record and the pending numbers record.

In addition to the LNP database 140, the lock manager 130 and various operations described herein may provide logical locking mechanism for database storing other types of data. For example, the lock manager 130 may facilitate the locking of records with online reservation services (e.g., online ticket brokers, online travel brokers, online hotel reservations, and so on), the locking of records within an enterprise, collaboration, or shared document service, and so on.

As described herein, the systems and methods facilitate the logical locking of a database, which may provide certain benefits over other locking mechanisms. For example, the systems and methods facilitate use of exclusive locks, where the lock manager 130 prevents one application with a lock on a record or object when another application already has locked the object (and may even have a shared lock). In some cases, one of the applications, via the lock manager 130, may request a shared lock on a record or object, which ensure that any read data will be consistent (or, unchanged) until the lock is released.

In some cases, the lock manager 130 may track the functions of the applications (or associated clients) in order to:

Release all locks from a given client, in response to the client requesting to release database locks, and/or when the client disconnects from the lock manager 130 (e.g., the client crashes), in order to avoid cases where a crashed or unavailable client maintains a lock or locks of objects in a database;

Report back to a client information about another client that currently has a lock on an object, which prevents the client's lock requests from being granted. For example, with respect to processing alignment, the lock manager 130, in reporting to clients, facilitates the targeting of specific transactions to specific processes that are already holding a specific lock, in order to avoid a "lock thrashing" situation.

In some cases, the lock manager 130 may enable client libraries that are LNP aware to cascade locks. For example, the applications 110, 115 may use a set of API libraries that offer a simple interface to the lock manager 130. These libraries run within the client, and are LNP aware, such that if the client asks to exclusively lock a TN or other object, the client also notifies the lock manager 130 to get a shared lock on the NPA-NXX-X and NPA-NXX objects as well, to prevent the related objects from being modified while the client is working on the TN, which is at the end of an object hierarchy (as described herein) that includes the related objects.

In some cases, the lock manager 130 facilitates simple and/or fast processing, where the lock manager 130 operates to manage clients and their requests to lock a simple string, which has no meaning or significance to the lock manager 130. For example, the lock manager 130 has no domain knowledge, and this operates, in a fast and efficient manner, and can be re-used across other domains.

In some cases, the lock manager 130 provides a lock tool, which provides a view into locks and facilitates the creation and/or release of locks. For example, the lock manager 130 may provide a command/control tool that allows a user to act as a client to the lock manager 130, to view the locks are in place and from which clients, as well as to create and release locks for testing or other related purposes.

Thus, the systems and methods described herein facilitate the locking of multiple records or items within a database, such as records that share a specific item and value for the item, among other benefits.

Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the term "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Furthermore, any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention not only may include additional elements to those implementations noted above, but also may include fewer elements.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in a specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

I claim:

1. A method for locking a number portability database during a database operation performed on one or more records stored within the number portability database, the method comprising:

accessing a database operation, including a read operation, a write operation, or a combination thereof to be performed by an application when updating the one or more records;

extracting an object identifier and a value associated with the database operation; and locking the one or more records stored within the number portability database that include the extracted object identifier and the value and, in a cascading manner, the one or more records related to the extracted object identifier and the value, while the database operation is performed on the one or more records;

locking a record within the number portability database that does not include the extracted object identifier and the value;

upon locking the record, creating an initial entry comprising the extracted object identifier and the value; and wherein the one or more records stored form a hierarchy and wherein the locking in the cascading manner is performed based on the hierarchy.

2. The method of claim 1, wherein the number portability database stores information associated with porting of telephone numbers from one carrier to another carrier; and wherein extracting the object identifier and the value associated with the database operation includes extracting an alphanumeric string as the object identifier that identifies an object type of a telephone number (TN) and the value that includes ten digits representative of a unique telephone number.

3. The method of claim 1, wherein the number portability database stores information associated with porting of telephone numbers from one carrier to another carrier; and wherein extracting the object identifier and the value associated with the database operation includes extracting an alphanumeric string as the object identifier that identifies an object type of a location routing number (LRN) and the value that includes ten digits representative of a unique location routing number.

4. The method of claim 1, wherein the number portability database stores information associated with porting of telephone numbers from one carrier to another carrier; and wherein extracting the object identifier and the value associated with the database operation includes extracting an alphanumeric string as the object identifier that identifies an object type of a service provider (SP) and the value that includes four digits representative of a unique service provider.

5. The method of claim 1, wherein the number portability database stores information associated with porting of telephone numbers from one carrier to another carrier; and wherein extracting the object identifier and the value associated with the database operation includes extracting an alphanumeric string as the object identifier that identifies an object type of a telephone number block (NPA-NXX) and the value that includes six digits representative of a unique telephone number block.

6. The method of claim 1, wherein the number portability database stores information associated with porting of telephone numbers from one carrier to another carrier; and wherein locking the one or more records includes locking the records that include:

a ported numbers record that stores information associated with telephone numbers previously ported between carriers; and a pending numbers record that stores information associated with telephone numbers to be ported between carriers.

7. The method of claim 1, wherein at least one record of the one or more records is created within the number portability database after the object identifier and the value are extracted from the database operation.

8. The method of claim 1, further comprising:

determining the database operation was performed by the application; and unlocking the one or more records that include the extracted object identifier and the value.

9. The method of claim 1, further comprising:

providing, for a user, via a lock manager, a view of the locked one or more records; and causing a creation and release of a lock of a record for testing purposes.

10. A non-transitory computer-readable medium with instructions stored thereon that, when executed by a system for locking a number portability database during a database operation performed on one or more records stored within the number portability database, cause the system to perform operations comprising:

accessing a database operation, including a read operation, a write operation, or a combination thereof to be performed by an application when updating the one or more records;

extracting an object identifier and a value associated with the database operation; and locking the one or more records stored within the number portability database that include the extracted object identifier and the value and, in a cascading manner, the one or more records related to the extracted object identifier and the value, while the database operation is performed on the one or more records;

locking a record within the number portability database that does not include the extracted object identifier and the value;

upon locking the record, creating an initial entry comprising the extracted object identifier and the value; and wherein the one or more records stored form a hierarchy and wherein the locking in the cascading manner is performed based on the hierarchy.

11. The non-transitory computer-readable medium of claim 10 with instructions operations, wherein extracting the object identifier and the value associated with the database operation includes extracting an alphanumeric string as the object identifier that identifies an object type of a telephone number (TN) and the value that includes ten digits representative of a unique telephone number.

12. The non-transitory computer-readable medium of claim 10 with instructions operations, wherein extracting the object identifier and the value associated with the database operation includes extracting an alphanumeric string as the object identifier that identifies an object type of a location routing number (LRN) and the value that includes ten digits representative of a unique location routing number.

13. The non-transitory computer-readable medium of claim 10 with instructions operations, wherein extracting the object identifier and the value associated with the database operation includes extracting an alphanumeric string as the object identifier that identifies an object type of a service provider (SP) and the value that includes four digits representative of a unique service provider.

14. The non-transitory computer-readable medium of claim 10 with instructions operations, wherein extracting the object identifier and the value associated with the database operation includes extracting an alphanumeric string as the object identifier that identifies an object type of a telephone number block (NPA-NXX) and the value that includes six digits representative of a unique telephone number block.

15. The non-transitory computer-readable medium of claim 10 with instructions operations, wherein locking the one or more records includes locking the records that include:
- a ported numbers record that stores information associated with telephone numbers previously ported between carriers; and
- a pending numbers record that stores information associated with telephone numbers to be ported between carriers.

16. The non-transitory computer-readable medium of claim 10 with instructions operations, wherein at least one of the one or more records is created within the number portability database after the object identifier and the value are extracted from the database operation.

17. The non-transitory computer-readable medium of claim 10 with instructions operations, further comprising:
- determining the database operation was performed by the application; and unlocking the one or more records that include the extracted object identifier and the value.

18. A system for locking items stored within a number portability database during a database operation performed on one or more records stored within the number portability database comprising:
- a processor configured to:
  - access a database operation, including a read operation, a write operation, or a combination thereof to be performed by an application when updating the one or more records,
  - extract an object identifier and a value associated with the database operation, and
  - lock the one or more records stored within the number portability database that include the extracted object identifier and the value and, in a cascading manner, the one or more records related to the extracted object identifier and the value, while the database operation is performed on the one or more records;
  - lock a record within the number portability database that does not include the extracted object identifier and the value;
  - upon locking the record, create an initial entry comprising the extracted object identifier and the value;
    - wherein the one or more records stored form a hierarchy and wherein the locking in the cascading manner is performed based on the hierarchy; and
  - a storage device, coupled to the processor, configured to:
    - store the one or more records.

19. The system of claim 18, wherein the number portability database stores information associated with porting of telephone numbers from one carrier to another carrier; and
- wherein the processor is further configured to lock a ported numbers record and a pending numbers record in response to identifying that data having a specific item type of a telephone number (TN) and an associated ten digit value for the telephone number is stored within the ported numbers record and the pending numbers record.

20. The system of claim 18, wherein the processor is further configured to:
- provide, for a user, a view of the locked one or more records; and
- cause a creation and release of a lock of a record for testing purposes.

* * * * *